Patented Apr. 19, 1932

1,854,762

UNITED STATES PATENT OFFICE

JEAN PAUL PRUNIER, OF LYON, FRANCE, ASSIGNOR TO SOCIETE DES USINES CHIMIQUES RHONE-POULENC, OF PARIS, FRANCE

MANUFACTURE OF SODIUM THIOSULPHATE

No Drawing. Application filed August 29, 1931, Serial No. 560,243, and in Great Britain September 26, 1930.

In the Journal of the Society of Chemical Industry (volume 12, 1893, p. 323), Kynaston has shown that sodium thiosulphate, $Na_2S_2O_3$ is formed when a mixture of calcium sulphite and sulphur is heated in presence of aqueous solutions of sodium sulphate. The reaction proceeds very slowly, however, since, after maintaining the mixture at boiling point for three hours, the quantity of calcium sulphite found to be converted into sodium thiosulphate was only 38.64 per cent.

I have discovered that this reaction can be caused to proceed with considerably greater rapidity if it is carried out in presence of bodies having an alkaline reaction.

According to the present invention, I provide a process for the manufacture of sodium thiosulphate by heating a mixture of calcium sulphite and sulphur in presence of aqueous solutions of sodium sulphate and in presence of bodies having an alkaline reaction.

As suitable such bodies, may be mentioned alkaline or alkaline-earth bases or alkali salts of weak acids, such as sodium sulphite, sodium sulphide or sodium carbonate. A small quantity of these substances, added to the reacting mass, already causes a considerable acceleration in the reaction, so that it is possible to obtain in from 2 to 3 hours a transformation with practically theoretical yields.

The thiosulphate solutions obtained by the process described above have an alkaline reaction due to the addition of the alkali body used as catalyst. If the catalyst used is an alkaline or alkaline-earth base, it may appear desirable, for the purpose of subsequently crystallizing the sodium thiosulphate, to transform the free base into a salt by addition of an acid; this operation is advantageously performed by addition of an alkali bisulphite such as, for example, sodium bisulphite. The alkali sulphite resulting from the addition of the bisulphite transforms into thiosulphate the small quantities of polysulphides or other sulphur compounds which may exist in the solution at the end of the reaction and the yield, with respect to the sulphur used, is thereby slightly improved.

The sodium thiosulphate dissolved in the liquid may be easily separated therefrom by the usual methods, after separation of the calcium sulphate precipitate.

I give hereafter, purely for the purpose of illustrating the invention and by no means as limitations thereof, examples of the manner in which the process according to this invention may be carried out. The parts are by weight.

*Example I.*—The following substances are introduced into an apparatus provided with a stirrer:

|  | Parts |
| --- | --- |
| Water | 1000 |
| $CaSO_3$ | 132 |
| $Na_2SO_4$ | 160 |
| CaO | 7 |
| Ground sulphur | 32 |

The mixture is cohobated with the application of heat for 4 hours, and is then filtered. The filtrate contains a quantity of sodium thiosulphate corresponding to a transformation of 88 to 90% of the sulphur employed; it contains, besides, small quantities of sodium poly-sulphides. This liquid is neutralized by adding 12 parts of a 38% solution of sodium bisulphite, heated to the boil and kept boiling for 30 minutes. The analysis shows that at that moment the quantity of sodium thiosulphate in the resulting liquid corresponds to the transformation of 94% of the sulphur employed.

*Example II.*—The following substances are introduced into an apparatus provided with a stirrer:

|  | Parts |
| --- | --- |
| Water | 1000 |
| $CaSO_3$ | 132 |
| 36 Bé. soda | 13 |
| Ground sulphur | 32 |
| Sodium sulphate | 160 |

The mixture is cohobated with the application of heat for 4 hours, and is then filtered. The filtrate is neutralized by adding 14 parts of a 38% solution of sodium bisulphite, heated to the boil and kept boiling for 30 minutes. The resulting liquid contains then a quantity of sodium thiosulphate corresponding to the transformation of 95.6% of the sulphur employed.

The thiosulphate may be separated by concentration and crystallization in the usual manner.

Although the invention has been illustrated with reference to the manufacture of sodium thiosulphate, it is understood that the same process is applicable to the manufacture of other alkali thiosulphates, by substituting another alkali sulphate for the sodium sulphate brought into the reaction.

What I claim and desire to secure by Letters Patent is:—

1. A process of manufacture of alkali thiosulphate solutions by causing sulphur and calcium sulphite to react with an aqueous solution of an alkali sulphate, characterized by performing the operation in the presence of bodies having an alkaline reaction.

2. A process of manufacture of sodium thiosulphate solutions by causing sulphur and calcium sulphite to react with an aqueous solution of a sodium sulphate, characterized by performing the operation in the presence of bodies having an alkaline reaction.

3. A process as claimed in claim 1, in which the operation is performed in the presence of an alkali base.

4. A process as claimed in claim 1, in which the operation is performed in the presence of an alkaline-earth base.

5. A process as claimed in claim 1, in which the operation is performed in the presence of an alkali base, the free base remaining in the mixture resulting from the reaction being transformed into a salt by addition of an acid, and the alkali thiosulphate is subsequently separated.

6. A process as claimed in claim 1, in which the operation is performed in the presence of an alkaline-earth base, the free base remaining in the mixture resulting from the reaction being transformed into a salt by addition of an acid, and the alkali thiosulphate is subsequently separated.

7. A process as claimed in claim 1, in which the operation is performed in the presence of an alkali base, the free base remaining in the mixture resulting from the reaction being transformed into a salt by addition of alkali bisulphite, and the alkali sulphite is subsequently separated.

8. A process as claimed in claim 1, in which the operation is performed in the presence of an alkaline earth base, the free base remaining in the mixture resulting from the reaction being transformed into a salt by addition of alkali bisulphite, and the alkali thiosulphate is subsequently separated.

In testimony whereof I have signed my name to this specification.

JEAN PAUL PRUNIER.